(12) United States Patent
Murphy

(10) Patent No.: US 8,284,486 B2
(45) Date of Patent: Oct. 9, 2012

(54) MICROSCOPE

(75) Inventor: Dennis Murphy, Huntingdon (GB)

(73) Assignee: Smartdrive Technology Limited, Earith, Huntingdon (GB)

( * ) Notice: Subject to any disclaimer, the term of this patent is extended or adjusted under 35 U.S.C. 154(b) by 798 days.

(21) Appl. No.: 12/162,483

(22) PCT Filed: Feb. 1, 2007

(86) PCT No.: PCT/GB2007/000347
§ 371 (c)(1),
(2), (4) Date: Apr. 3, 2009

(87) PCT Pub. No.: WO2007/088369
PCT Pub. Date: Aug. 9, 2007

(65) Prior Publication Data
US 2009/0303585 A1  Dec. 10, 2009

(30) Foreign Application Priority Data
Feb. 2, 2006  (GB) .................................. 0602083.8

(51) Int. Cl.
*G02B 21/26* (2006.01)
(52) U.S. Cl. .................. 359/391; 359/368; 359/393
(58) Field of Classification Search .......... 359/368–384, 359/391–394
See application file for complete search history.

(56) References Cited

U.S. PATENT DOCUMENTS

| | | | | |
|---|---|---|---|---|
| 4,575,199 A | * | 3/1986 | Lisfeld | 359/392 |
| 5,355,721 A | * | 10/1994 | Las Navas Garcia | 73/82 |
| 5,831,764 A | * | 11/1998 | Brinkmann et al. | 359/392 |
| 5,867,310 A | * | 2/1999 | Hasegawa | 359/381 |
| 6,337,766 B1 | * | 1/2002 | Fujino | 359/383 |

FOREIGN PATENT DOCUMENTS

| | | |
|---|---|---|
| CN | 2164562 | 5/1994 |
| DE | 3429617 A1 | 2/1985 |
| EP | 0174616 A2 | 3/1986 |
| GB | 1041492 A1 | 9/1966 |
| JP | 06-207807 | 7/1994 |
| JP | 08-179222 | 7/1996 |
| JP | 2004-70036 | 3/2004 |
| JP | 2005-503244 | 2/2005 |
| JP | 2005-84588 | 3/2005 |

\* cited by examiner

*Primary Examiner* — Thong Nguyen
(74) *Attorney, Agent, or Firm* — patenttm.us

(57) ABSTRACT

Control apparatus for a microscope having at least one rotary control member for adjustment of the microscope, the apparatus comprising: a motor; a coupling arrangement driven, in use, by the motor; and a mount arrangement to provide adjustable positioning of the motor relative to the control member, to cause the coupling arrangement to engage the rotary control member to cause the control member to be driven by rotation of the motor.

27 Claims, 8 Drawing Sheets

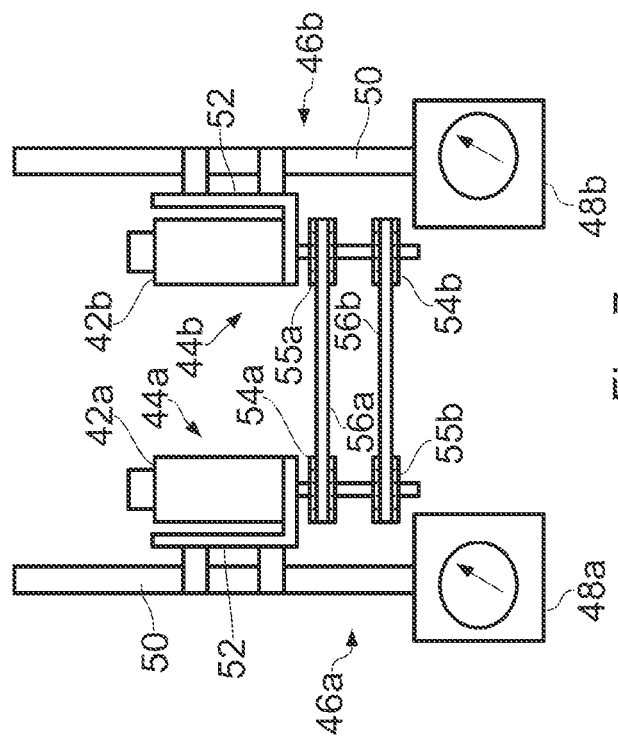
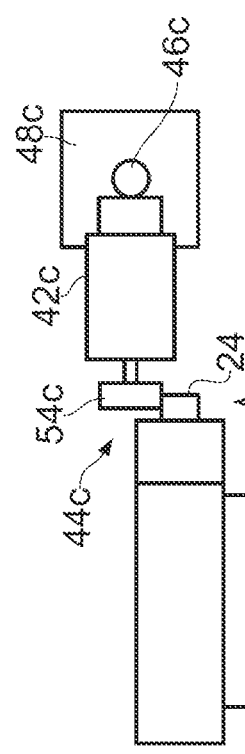
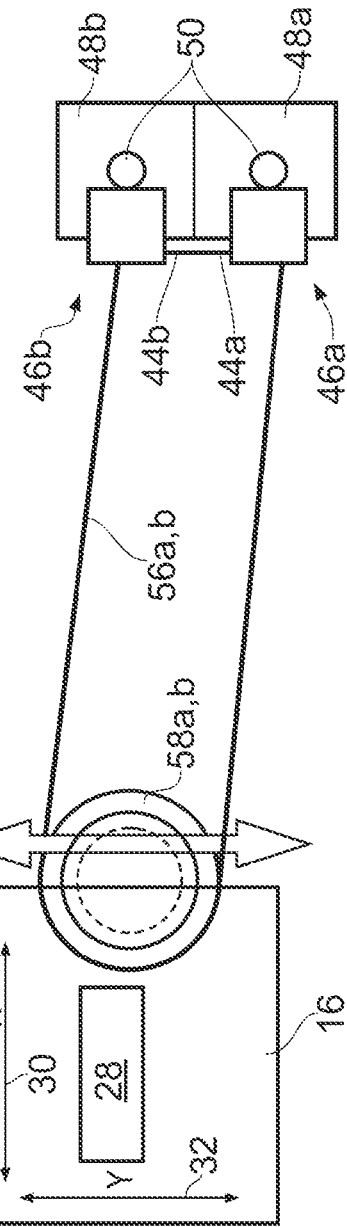

MICROSCOPE

CROSS-REFERENCE TO RELATED APPLICATIONS

This application is a national phase entry of PCT/GB2007/000347 filed Feb. 1, 2007.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION BY REFERENCE OF MATERIAL SUBMITTED ON A COMPACT DISC

Not Applicable.

FIELD OF THE INVENTION

The present invention relates to microscopes.

BACKGROUND OF THE INVENTION

Many high quality microscopes for scientific laboratories and the like are sold with a manual stage having rotary control members which allow the user to move the microscope stage, thereby moving a sample relative to the optical system. For some requirements, manual control of the stage is found to be the most convenient method. However, manufacturers also provide motorized stages which are mounted on the microscope in place of the manual stage and incorporate computer controlled motors, allowing the stage to be controlled from the computer. This is desirable for some uses (such as to allow a sample to be inspected at randomly chosen positions). However, motorized stages are expensive (typically as expensive as the microscope itself) and render the microscope unusable for manual control, unless the motorized stage is replaced with a manual stage.

BRIEF SUMMARY OF THE INVENTION

The present invention provides control apparatus for a microscope having at least one rotary control member for adjustment of the microscope, the apparatus comprising:
   a motor;
   a coupling arrangement driven, in use, by the motor; and
   a mount arrangement to provide adjustable positioning of the motor relative to the control member, to cause the coupling arrangement to engage the rotary control member to cause the control member to be driven by rotation of the motor.

The coupling arrangement may comprise a rotary member driven, in use, by the motor, and positionable by means of the mount arrangement to bear on the control member to cause the control member to turn. The rotary member may engage the control member by friction or by meshing formations.

Alternatively, the coupling arrangement may comprise a rotary member driven, in use, by the motor, and an endless belt around the rotary member and the control member. The endless belt is preferably of flexible material and is preferably of resilient material. The endless belt may be toothed for engagement with the rotary member and control member.

The coupling arrangement preferably further comprises a wheel member for fitting to the control member to convey movement to the rotary member. The wheel member may have an aperture for receiving the control member, and fixing means for engaging the control member when present in the aperture, to retain the control member therein. The fixing means may comprise at least one threaded member. The wheel member may have an outer surface formed to reduce slippage when being driven. The outer surface may be toothed.

Preferably, the mount arrangement is adjustable in height relative to the control member.

The mount arrangement may include clamp means operable to clamp the mount arrangement at a chosen position. The apparatus may further comprise clamp means operable to clamp the microscope at a chosen position. The or each clamp means is preferably operable to clamp the mount arrangement and/or microscope at any position within a range of positions. The or each clamp means may include a magnetic clamp arrangement. The magnetic clamp arrangement may comprise a manually movable magnet within the mount arrangement, and a surface on which the mount arrangement stands, in use, there being metal associated with the surface for causing the mount arrangement to grip the surface or be released by movement of the magnet. The surface is preferably provided by a metal plate. The surface is preferably provided by a body on which the microscope stands, in use.

The motor may be an electric motor, preferably a stepper motor. The apparatus may comprise control means operable to control the motor to create adjustment of the microscope. The control means preferably comprises an analogue user control for use in instructing adjustment of the microscope. The control means may comprise a computer interface for receiving instructions for adjustment.

Preferably the apparatus is operable to drive a plurality of rotary control members. There may be a plurality of motors, coupling arrangements and mount arrangements as aforesaid, for driving respective control members.

Possibly, the coupling arrangement comprises a rack associated with the control member and the rack driven by rotation of the motor.

Possibly, the mounting arrangement comprises a platform for the motor proportionately displaceable in use as the control member is driven by rotation of the motor.

Typically, the platform is proportionately displaced with the control member. Generally, the platform is proportionately displaceable in unison with the control member. Possibly, the platform is electively displaceable to alter tension in the coupling arrangement. Generally, the platform is displaced by a platform motor.

Also in accordance with aspects of the present invention there is provided a microscope having a control arrangement as described above.

Typically, the microscope has a first rotary control and a second rotary control. Possibly, the first rotary control and the second rotary control are coaxial with each other and each engaged by a first coupling arrangement and a second coupling arrangement both the first and the second coupling arrangements are in accordance with aspects of the present invention.

Possibly, the first coupling arrangement and the second coupling arrangement are side-by-side. Alternatively, the first coupling arrangement and the second coupling arrangement are provided within each other and substantially in the same plane. Possibly, the first coupling arrangement has a rotary member to bear upon a first control member and the second coupling arrangement has a belt to engage a second control member.

Possibly, the control apparatus incorporates a control switch for incremental movement of the control member by rotation of the motor.

Possibly, the rotary control member and/or rotary member incorporate calibration marks. Generally, the calibration marks provide an indication as to relative movement between the rotary control member and the motor.

Typically, the control apparatus incorporates a detector for determining stall in the motor indicative of a limit for driving the control member by rotation of the motor.

Further in accordance with aspects of the present invention there is provided a control apparatus for a microscope, the apparatus having a rotary control to cause adjustment of the microscope and whose position changes as adjustment is effected, the apparatus comprising a belt coupled to the rotary control and the belt associated with a drive mechanism to provide movement to the rotary control in use, the belt held in tension about the rotary control and the drive mechanism, the rotary control and the drive mechanism secured upon mountings for proportionate displacement to each other to specify desired tension in the belt and to accommodate position changes of the rotary control as the rotary control is adjusted by the drive mechanism.

BRIEF DESCRIPTION OF THE SEVERAL VIEWS OF THE DRAWING

Examples of the present invention will now be described in more detail, by way of example only, and with reference to the accompanying drawings, in which:

FIG. 7 is an elevation of part of an alternative layout;

FIG. 8 shows the layout of FIG. 7, in plan;

DETAILED DESCRIPTION OF THE INVENTION

Figure 1:
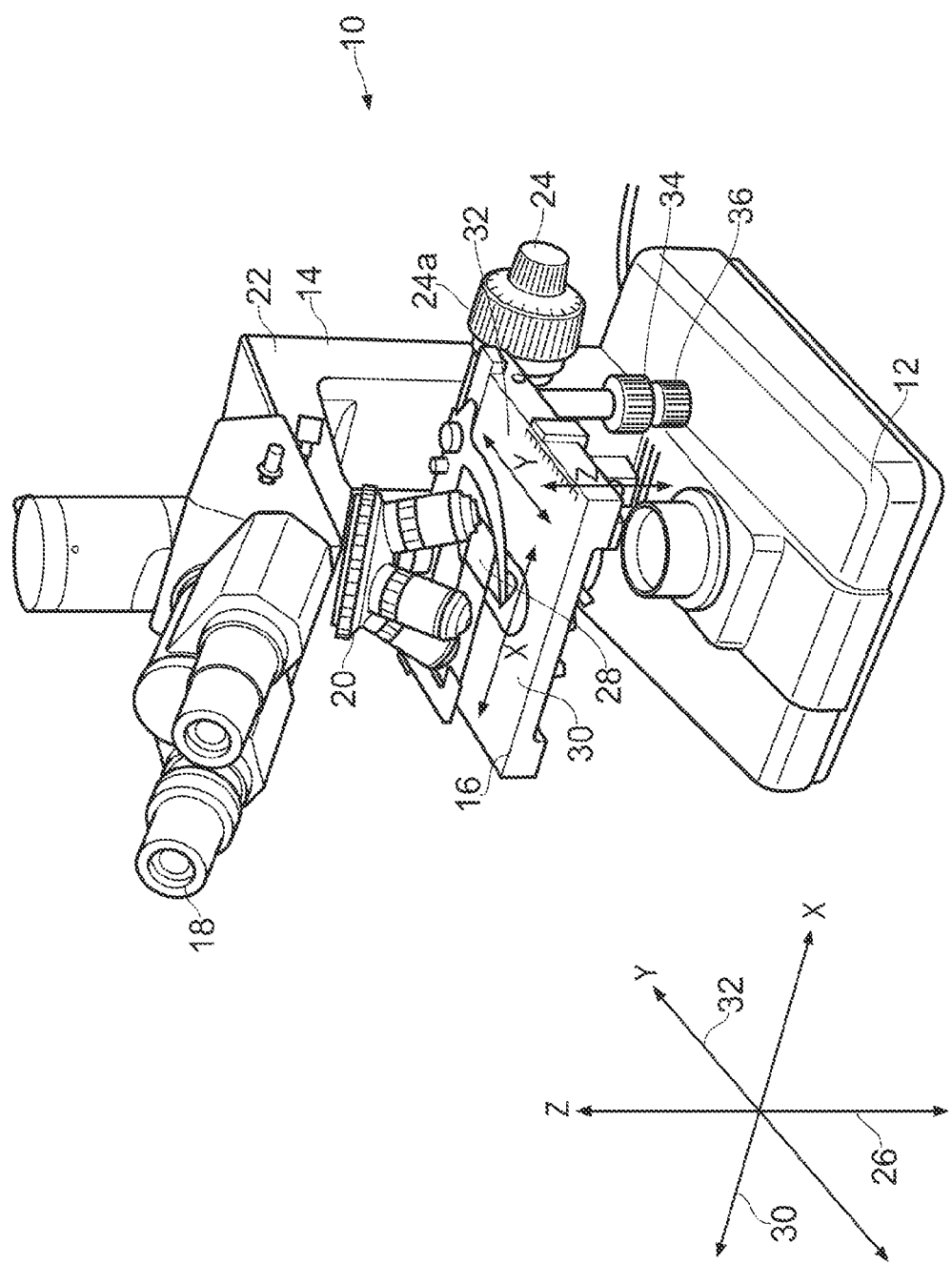
FIG. 1 is a simple perspective view of a conventional microscope with a manual stage.

FIG. 1 shows a microscope 10 of the type commonly known as an upright microscope. The microscope 10 has a base 12, a column 14, a stage 16, eyepieces 18 and an optical system at 20. The eyepieces 18 and optical system 20 are mounted on an arm 22 supported by the column 14. The stage 16 is supported by the column 14 and is movable up and down the column 14 by manual rotation of one of the focus control knobs 24, 24a. Vertical movement of the stage 16 is referred herein as movement on the Z axis as indicated by the arrow 26. The Z axis 26 is perpendicular to the plane of the stage 16. Accordingly, movement of the stage 16 along the Z axis 26, toward or away from the optical system 20, serves to adjust the focus of the microscope relative to a sample 28.

The view of the sample 28, obtained through the eyepieces 18, can be changed by moving the stage 16 relative to the eyepieces 18, by movement in the X axis 30 or the Y axis 32. The X, Y and Z axes form three orthogonal axes. Accordingly, movement in the X and Y directions does not affect focus of the microscope. Movement in the X and Y directions is controlled by two concentric rotary knobs 34, 36. One of the X and Y axes is controlled by the outer knob 34 and the other is controlled by the inner knob 36 which extends beyond the lower extremity of the knob 34.

Typically, a user will initially focus the microscope by using one of the knobs 24, 24a.

In this example, the larger knob 24a provides coarse focus control, and the smaller knob 24 provides fine focus control.

Once the focus has been set, further movement of the knobs 24, 24a is generally not required. The user will then reach for the knobs 34, 36, which allow the user to navigate around the sample 28 by manipulation of the knobs 34, 36 until the desired location on the sample 28 is within the field of view of the optical system 20.

Manual operation of the microscope 10, in the manner described, is particularly convenient when it is desired to review a sample quickly, to assess whether more detailed analysis is appropriate.

The remaining drawings illustrate the manner in which apparatus in accordance with the invention can be used to provide motorized control of the microscope 10.

These drawings show apparatus 40 for the microscope 10, which has rotary control members 24, 34, 36 as has been described, for adjustment of the microscope 10. The apparatus 40 comprises motors 42, coupling arrangements 44 and mount arrangements 46. The coupling arrangements 44 are driven, in use, by the motors 42. The mount arrangements 46 support corresponding motors 42 to provide adjustable positioning of the motors 42 relative to the control members 24, 34, 36, to cause the coupling arrangements 44 to engage the rotary control members 24, 34, 36 to cause the control members 24, 34, 36 to be driven by rotation of the motors 42.

In more detail, the mount arrangements 46a, b each have a clamp 48a, b, to be described, supporting a post 50 on which the motors 42a, b are mounted at a height which can be adjusted by means of a releasable fixing 52. The rotation axis of the motors 42a, b are mounted substantially vertically and the motors 42 drive wheels 54a, b which are generally horizontal to rotate about the vertical motor axes.

An endless belt 56a, b extends around each wheel 54a and a corresponding one of the knobs 34, 36. The belts 56 are of flexible material which is preferably resilient, such as a natural or synthetic rubber or rubberized material. The wheels 54 are preferably toothed and the belts 56 are also preferably toothed to create engagement between the wheels 54 and the belts 56 and which is not reliant solely on friction, so that the engagement remains consistent over a range of different tensions which may arise within the belt 56, during use.

Figure 5:
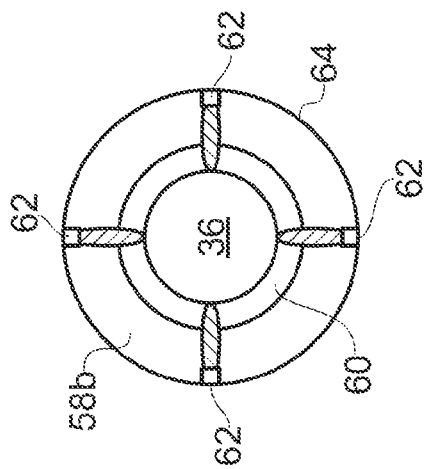
FIG. 5 is a section along the line 5-5 of FIG. 4.
Figure 4:
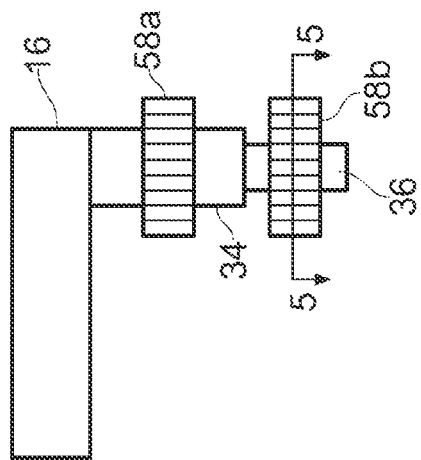
FIG. 4 is a partial elevation of the rotary control members for the stage of the microscope shown in FIGS. 2 and 3 and including components of the apparatus of the invention.

The belts 56 may directly engage the knobs 34, 36. However, additional wheel members 58a, b (FIGS. 4 and 5) are preferably provided for fitting to the control members 34, 36, to convey movement from the belts 56 to the rotary members 34, 36. Each wheel member 58 has a central aperture 60 for receiving the control member, illustrated in FIG. 5 as the inner control knob 36. Fixing means 62 in the form of grub screws are provided around the wheel members 58 and can be adjusted to grip the control member 36, thereby mounting the wheel member 58 on the control member 36 by retaining the control member 36 in the aperture 60. It is to be noted that the aperture 60 is oversize relative to the knob 36, in this example. This is preferred to provide tolerance, allowing the wheel member 58 to be fitted to the corresponding knob 36 of microscopes from a range of manufacturers, thus helping to make the apparatus 40 universal or quasi-universal in its application. Furthermore, the wheel member 58 will help equalize or provide a gear ratio between the rotary control member and the motor to vary the sensitivity of adjustment.

The wheel members 58 are toothed around their outer circumference 64, for better engagement with the belts 56, as described above in relation to the wheels 54.

A further wheel member, of similar design, may be fitted to the focus knob 24, if desired. Further alternatively, the focus knob 24 may be driven by a wheel member associated directly with a motor and acting directly by bearing on the focus knob 24. Similarly, one of the knobs 36 may be acted upon directly by a wheel that bears directly upon it and the wheel associated directly with a motor, as will be described later with regard to FIG. 11.

Figure 3:
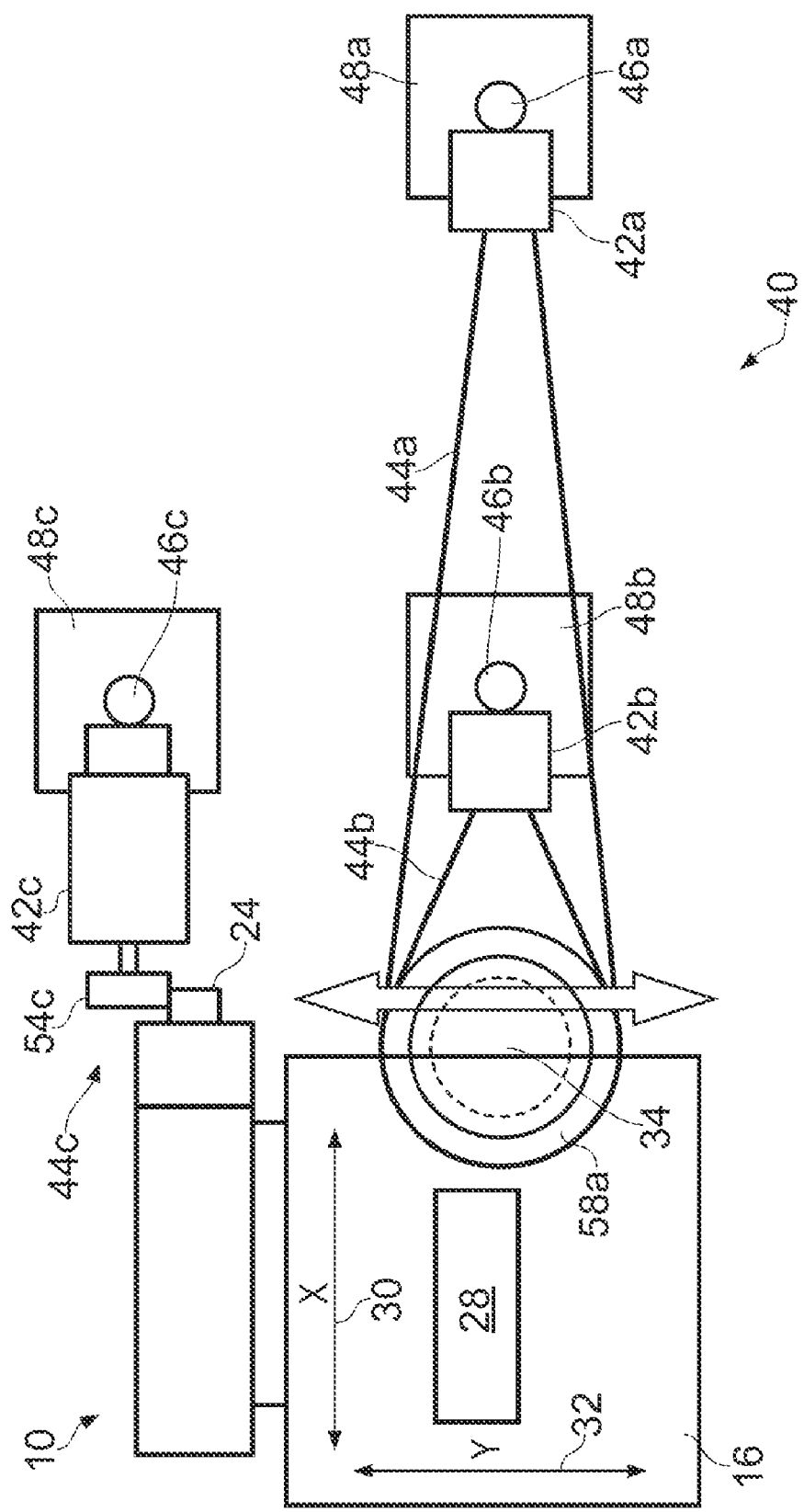
FIG. 3 is a plan view of the apparatus of FIG. 2 with some features of the microscope omitted for clarity.

FIG. 3 illustrates a preferred arrangement in which one of the belts 56 is longer than the other, allowing one of the mounts 46 to be spaced further from the knobs 34, 36 than the other. In this example, the wheel members 58 are the same in diameter. Alternatively, one of the wheel members 58 may be larger in diameter than the other, so that the longer belt 56 can more easily pass around the other motor and belt arrangement.

The third mount arrangement 46c (omitted from FIG. 2, in the interests of clarity) carries a third motor 42c which turns about a generally horizontal axis to turn a generally vertical wheel 54c. The mount arrangement 46c positions the wheel 54c to bear directly on the focus knob 24, so that the wheel 54c forms part of a coupling arrangement 44c to engage the knob 24, to cause the knob 24 to turn when the motor 42c turns. Thus, the coupling arrangement 44c provides direct drive from the wheel 54c to the knob 24, without using a belt. There may be meshing formations on the wheel 54c and on the knob 24, or these components may engage solely by friction.

Figure 2:
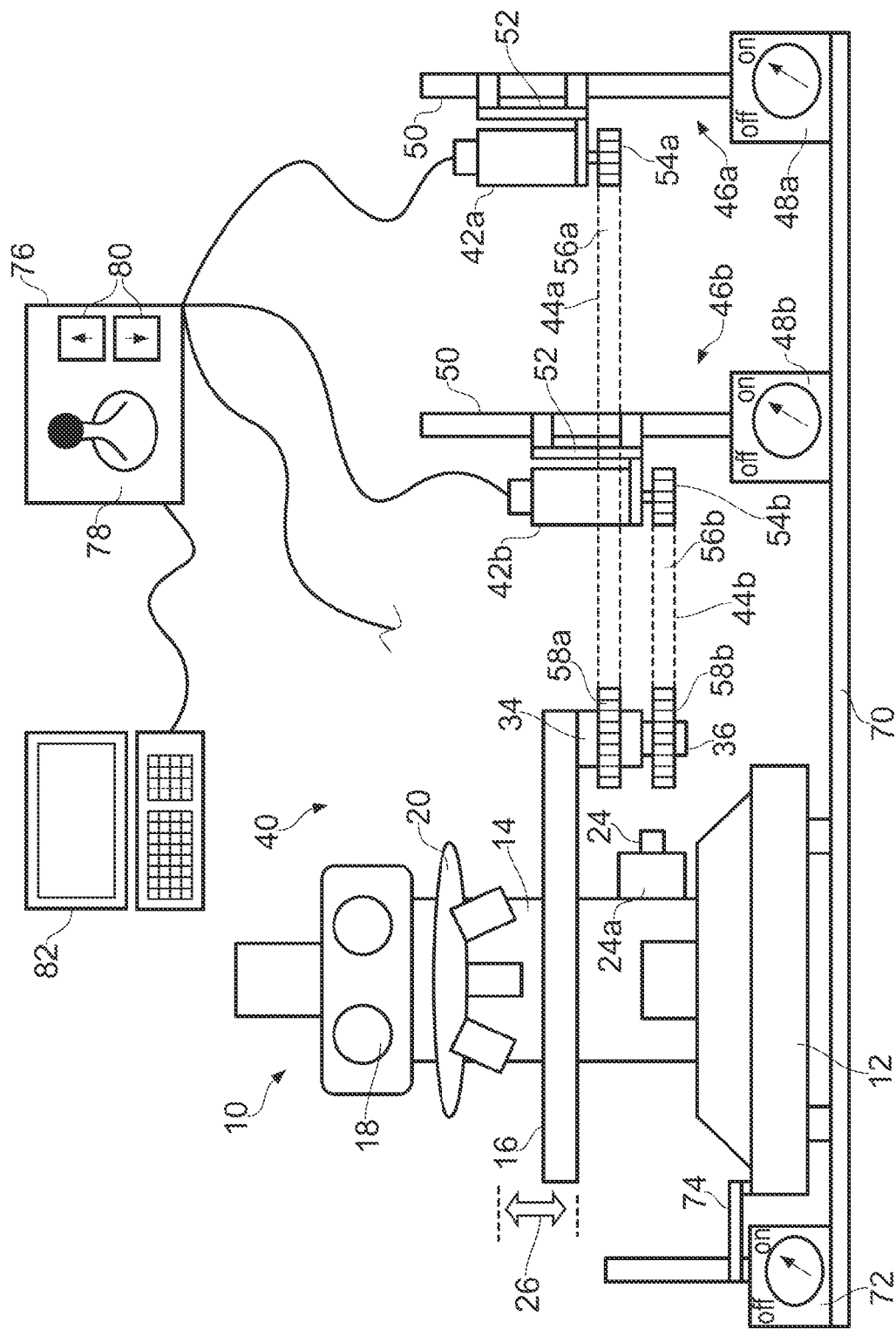
FIG. 2 is an elevational view of control apparatus being used in conjunction with an apparatus of the type shown in FIG. 1, with the focus control arrangements omitted.
Figure 6:
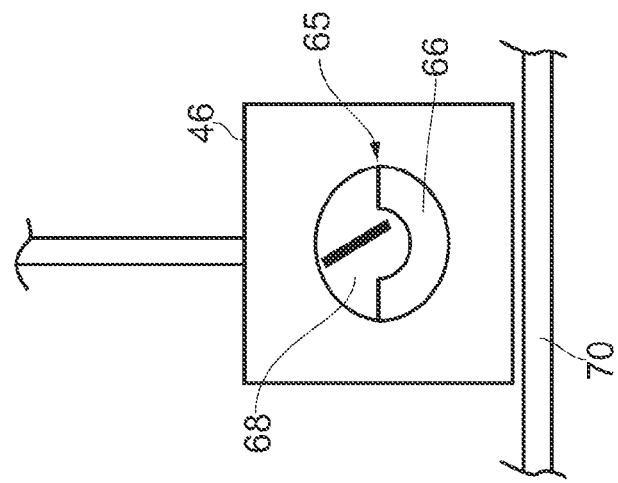
FIG. 6 is a simple diagram of the mount arrangement of the apparatus of FIGS. 2 and 3.

The mount arrangements 46 can now be described in more detail. A schematic cross-section through one of the mount arrangements 46 is shown in FIG. 6. The body of the mount 46 houses a cylinder 65, one half of which is magnetic at 66, and the other half of which is non-magnetic at 68. There is a manual control by which the magnet 66 can be turned around its axis. The arrangement 46 sits on a metal plate 70. When the cylinder 65 is turned to bring the magnetic half 66 alongside the plate 70, magnetic attraction arises between the magnet 66 and the plate 70, thus clamping the arrangement 46 to the plate 70. Alternatively, the control 68 can be used to turn the cylinder to move the magnet 66 away from the plate, to release the magnetic attraction, thereby freeing the arrangement 46 from the plate 70 and allowing the arrangement 46 to be lifted off or moved across the plate 70. Accordingly, each of the mount arrangements 46a, b, c can be moved across the plate 70, with the respective magnet 66 disengaged, until the desired position is reached, at which the arrangement 46 can be clamped in position by engaging the magnetic clamp, as just described. Provision of a continuous plate 70, as shown in FIGS. 2 and 3, allows the mount arrangements 46 to be positioned at any position within a wide range of positions.

The plate 70 has been described as a metal plate. However, the plate could be non-metallic, having metal associated with its surface for causing the mount arrangements to grip the surface or be released by movement of the magnet. For example, the plate 70 could be of a plastics material with a metal backing or impregnation.

The clamp arrangements 48a, b, c allow the apparatus 40 to be set up with the mount arrangements 46a, b positioned to create sufficient tension within the belts 56 to ensure they grip the wheels 54a, b and the wheel members 58a, b, and allow the mount arrangement 46c to be positioned to ensure adequate engagement between the wheel 54c and the focus knob 24. The mount arrangements 46 can then be clamped into these positions.

Stability of the whole arrangement is improved by providing the plate 70 to be sufficiently large to allow the microscope 10 to stand on the plate 70. An additional clamp arrangement 72 may be provided, again based on a magnetic clamp of the type described, and having a clamp arm 74 by means of which the microscope 10 may be clamped to the plate 70 by engagement with an appropriate surface or feature of the microscope 10.

Once the apparatus 40 has been set up as described, operation of the motors 42 allows the three knobs 24, 34, 36 to be controlled individually, by control of the appropriate motor 42a, b, c. For example, movement of the motors 42a, b is conveyed through the wheels 54a, b to the corresponding belt 56a, b, and then to the corresponding wheel member 58a, b and thus to the corresponding control 34, 36. This results in movement of the stage 16 along the X or Y axis, or a combination of both movements. In addition, the motor 42c can be used to turn the wheel 54c to adjust the focus knob 24.

Control of the motors 42 is preferably provided by a control circuit 76. In this example, the circuit 76 has manual controls which are analogue, such as a joystick 78 and plus/minus focus controls 80. The joystick 78 allows a user to instruct X and Y movement of the stage 16 by simple manipulation of the joystick 78 in a manner conventional in itself. Movements of the joystick 78 are converted into signals for the appropriate motor 42a, b or combination of motors 42a, b, resulting in these motors turning by an appropriate amount to move the stage 16 along the X and Y, axes, as instructed by the user operating the joystick 78. Similarly, the focus controls 80 can be pressed by the user to control movement in the Z axis to bring an image into focus. The circuit 76 converts operation of the controls 80 into appropriate signals to the motor 42c, thus resulting in rotation of the knob 24.

In a further example, the circuit 76 may have an interface to a computer 82 to allow control of the stage 16 by the computer 82. In this example, the circuit 76 converts instructions from the computer 82, to appropriate control signals for the motors 42a, b, c.

In many designs of microscope 10, the knobs 34, 36 are mounted on the stage 16 and move with the stage, as the knobs 34, 36 are manipulated.

Accordingly, the position of the knobs 34, 36, relative to the mount arrangements 46a, b will change as the stage 16 is moved. This movement is accommodated by the belts 56. Movement of the knobs 34, 36 will result in changes in the belt tension. By providing flexible and resilient belts 56, changes in tension can be accommodated over a range of tensions, without the belts becoming disengaged, and this is particularly so when the belts 56, wheels 54a, b and wheel members 58a, b are all toothed to provide consistent engagement over a range of belt tensions.

Furthermore, it is to be understood that the range of movement of the stage 16 is relatively small in comparison with other dimensions of the apparatus 40, in many microscope designs.

In some microscope designs, the range of movement of the stage 16, particularly in the Y direction, may be too great for the arrangement described above. For example, excessive movement in the Y direction may result in the belt 56*a* coming into contact with the motor 42*b*, as the stage moves along the Y axis 32. FIGS. 7 and 8 illustrate an alternative arrangement which can accommodate greater Y axis movement. In this arrangement, the mount arrangements 46*a, b* are placed close to each other (FIG. 7) or alongside each other (FIG. 8). Each belt 56*a*, 56*b* passes around the corresponding wheel 54*a, b* driven by the corresponding motor 42*a*, 42*b*, and also passes around a free running guide wheel 55*a*, 55*b* which is free running on the axis of the other mount arrangement 46*b, a*. The belts 56*a*, 56*b* also pass around the wheel members 58*a*, 58*b*, as before. Accordingly, the belt 56*a* is driven by the wheel 54*a*, is free running around the wheel 55*a* at the mount arrangement 46*b*, and drives the wheel 58*a*. Similarly, the belt 56*b* is driven by the wheel 54*b*, is free running around the wheel 55*b* at the mount arrangement 46*a*, and drives the wheel 58*b*. Accordingly, both belts 56*a, b* follow a path which is the same in plan, as can be seen from FIG. 8. This allows movement of the stage 16, particularly along the axis, without conflict between the various components.

The control apparatus 40 provides a convenient way to convert a manual microscope 10 to provide motorized operation, without any modification of the microscope 10 (other than to mount the wheel members 58*a, b*, if used). Motorised control can be from the circuit 78, without requiring a computer to be present or switched on. The apparatus 40 can readily be dismantled to revert to full manual control of the microscope, if required. The apparatus 40 is expected to be of universal application to a very wide range of microscopes from various manufacturers and model ranges, particularly because the ability of the mount arrangements 46 to be secured at any of a range of positions will allow them to be appropriately located relative to the knobs 24, 34, 36 of many different microscopes and additionally, the fixing 52 further improves this universal fitting ability.

As indicated above it is important to maintain tension within the belts utilized to drive and move the rotary control members in accordance with aspects of the present invention. In most circumstances it is movement in the Y direction which can be most problematic but generally such movements are relatively small and therefore remain within the tension elasticity of the belts. However, where movements are significantly greater it will be appreciated that the rotary control members similarly move and therefore presentation of the belts may result in alterations in tension which are significant and at least alter responsivity. In such circumstances as depicted in FIGS. 9 and 10 further adjustability is provided with regard to a control apparatus and in particular a microscope incorporating such as a control apparatus.

In order to accommodate movement in the Y direction which results in movement of a rotary control 134 in the direction of arrowheads 200, motors 142 are provided to drive the rotary control members and are located on a platform 201. It will be noted that the rotary control members 134 are coaxial one upon the other and therefore, as seen in FIG. 10, only one control member 134 is shown with a wheel 158 thereabout. In such circumstances respective belts 144 extend from the motors 142 and typically wheels driven by those motors 142 to a respective wheel 158 in order to drive movement of the rotary control 134. In such circumstances, the arrangement depicted in FIGS. 9 and 10 operates in a similar fashion to that described previously in that movement of the rotary control member 134 is determined by the motors 142 in order to move a platform 116 selectively in X and Y directions, by respective movement of the rotary control members 134. As indicated previously movement in a Z direction, that is to say in a plane perpendicular to the drawing depicted in FIG. 10 and as illustrated by arrowheads 202 in FIG. 9, is through a further motor 203 directly acting through a wheel 204 bearing upon a rotary control member 205.

By provision of the platform 201 secured upon an appropriate lateral displacement mounting arrangement 206 it will be understood that the platform 201 can be moved proportionately with the platform 116 in concert with the rotary control members 134. Thus, tension within the belts 144 remains constant throughout the displaceable range of the arrangement. In order to provide that lateral movement in the direction of arrowheads 207 generally the platform 201 is secured upon a lead screw 208 which is driven by a platform motor 209 to provide desired movement in the direction of arrowheads 207. Generally the platform 201 and the platform 116 will move the same distance and at the same velocity to provide consistency for controlled operation.

Figure 9:
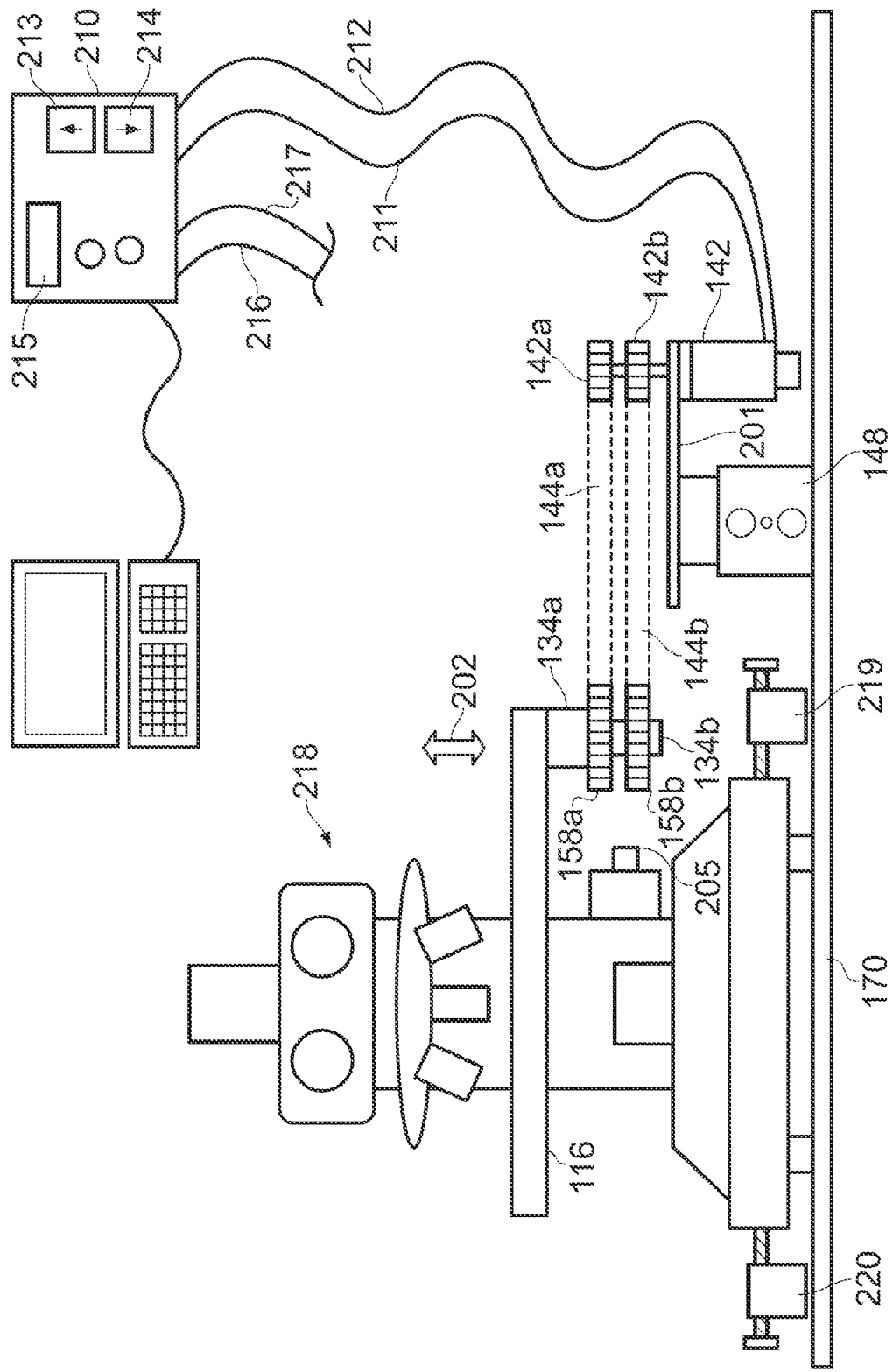
FIG. 9 provides a schematic side view of an alternative control arrangement in accordance with further aspects of the present invention.
Figure 10:
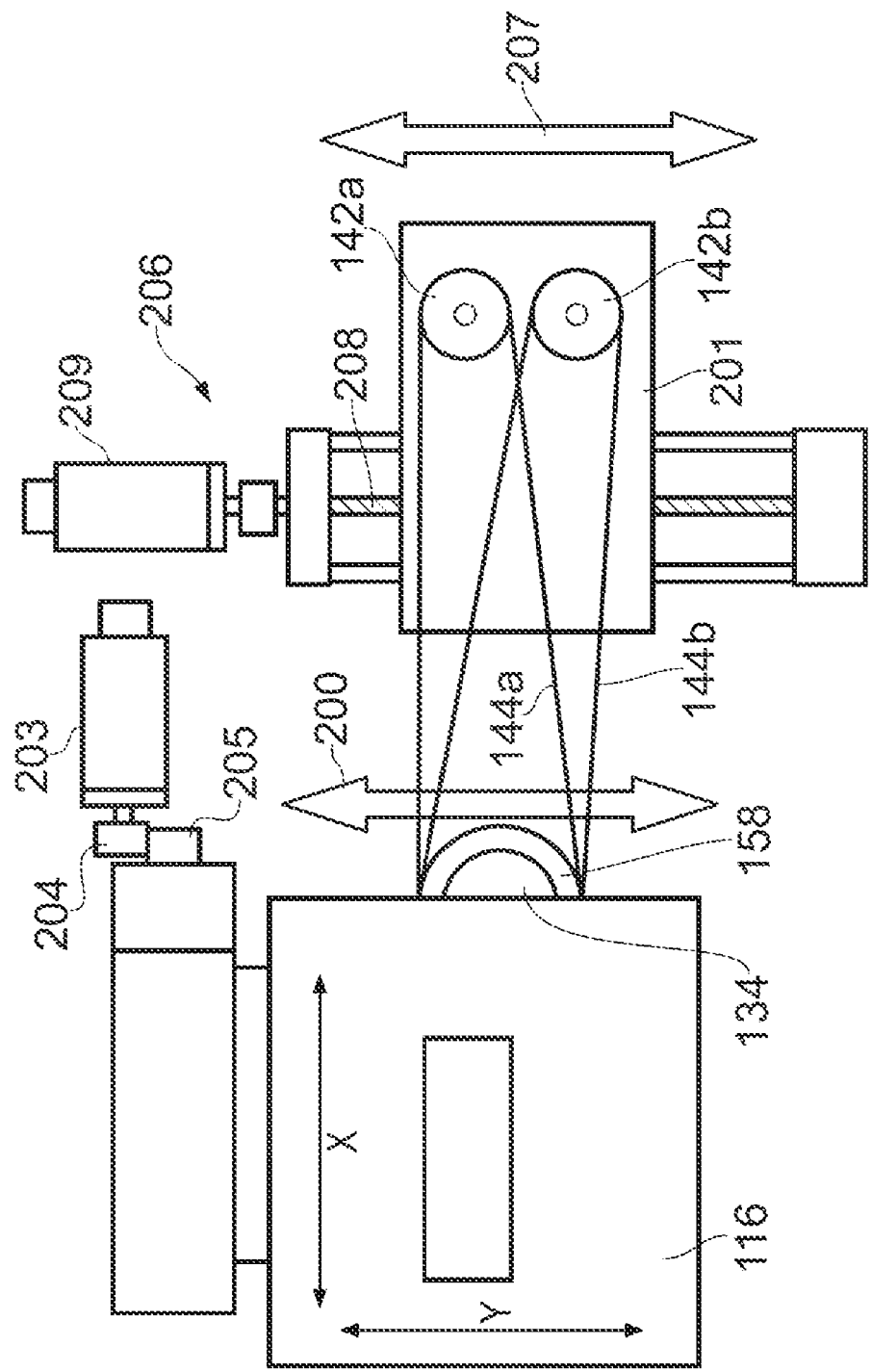
FIG. 10 is a schematic plan view of the alternative control arrangement depicted in FIG. 9.

As depicted in FIG. 9 generally the coupling arrangements comprising wheels 158*a, b* along with belts 144*a, b* and motor wheels 142*a, b* are arranged one upon the other side-by side to engage respective coaxial rotary control members 134*a*, 134*b*. The motors 142 driving the respective wheels 142*a, b* as can be seen are secured to the platform 201 which in turn is driven by the platform motor 209 (not shown) as described previously with regard to FIG. 10. In such circumstances, potential for significant variation in tension in the belts 114 is removed and furthermore the possibility of entanglement between the belts 144*a, b* in use is reduced.

Control signals for the motors 142 driving the motor wheels 142*a, b* are received from a control device 210 through appropriate cables 211, 212. It will be appreciated that the cables 211, 212 may be replaced by wireless communications of respective signals for X and Y movement for driving respective motors 142 for the wheels 142*a, b*. The control box 210 typically incorporates simple up/down switches 213, 214 along with a display 215 in order to show position. In order to show that position generally through the taut associations within the arrangement after calibration it will be possible to simply indicate position by an appropriate coordinate value in the display 215. To provide such calibration generally the wheels 158*a, b*, 142*a, b* may incorporate markings to show correct position relative to positions on the frame of a microscope or otherwise. In order to provide complete control generally, control cables 216, 217 will also be provided for driving the platform motor 209 appropriately for consistency as described previously with regard to tension in the belts 144 as well as control in respect of the Z axis through the motor 203 (FIG. 10) driving the rotary control 205.

For further control and potential randomization with regard to sampling, a personal computer may also be associated with the control 210 to allow refinements and movements of the platform 116 through movement and driving of the wheels and associated rotary control members 134 by belts 144 and wheel/motor associations 142.

It will be appreciated that movements of the platform 201 as indicated are preferably in uniformity and unison with the platform 116 which carries the rotary control members 134. In such circumstances it is important that initially appropriate assembly is made and therefore as described previously generally mountings 148 will be provided to locate the platform 201 and in particular the platform mounting arrangement 206 upon an appropriate surface or plate 170. It will also be noted that a microscope 218 is secured to the 117 surface or plate 170 through mounting brackets 219, 220 such that robust relative location is achieved.

Although it is advantageous for the platform 116 and the platform 201 to move in unison it will also be possible in some circumstances to provide relative movement provided tension is maintained or increased or decreased as required specifically by operational necessity in the belts 144. Similarly, although depicted substantially with a straight line movement in the direction 110 of arrowheads 207, it will also be possible through appropriate lead screw configuration or otherwise to achieve curved movement of the platform 201 again to provide desired and specific tension in the belts 144. Provision of the platform 201 allows sustained presentation of specific desired tension in the belts 144 by appropriate movement for consistency with the platform 116. It will also be appreciated that the relative sizes of the wheels 158 and 142 of the motors will provide a gear ratio effectively in the coupling arrangements. Thus, stepped movements of the motors 142 may precipitate different movements in the rotary control members depends upon the wheel 142, 158, sizes provided with initial tension set by positioning of the mountings 148 and subsequent maintenance and adjustment of that tension through displacement of the platform 201. A toggle switch in contact with the belt 144 may act as a crude indicator of tension and the platform 201 adjusted for tension in response to unacceptable indication of tension. More sophisticated tension indicators may also be used.

As described above there are particular advantages with regard to use of belts in order to maintain consistency through tension in the belt between the driving motor and the rotary control member over an axial range of displacement as well as with regard to direct driving of a rotary control member through a wheel associated with a motor but it will also be understood a rack and pinion type approach may be taken where the rotary control member or an associated wheel may engage a toothed rack which is driven linearly by a motor in accordance with aspects of the present invention in order to precipitate movements of that rotary control member and therefore adjustment of the platform. In such circumstances, and subject to space requirements it may be possible to provide several racks which engage respective rotary control members and each rack driven by a different wheel at a different rate for a finer or coarser adjustment as required. Further alternatively, several motor wheels driven by a motor may be engagable with the rack selectively. The size of such wheels typically determining the rate with which the motor drives the rack and so turns the associated wheel/rotary control member for adjustment of the platform as described above.

As described with regard to FIG. 9, generally up down buttons 213, 214 will be provided. These buttons 213, 214 may have a push button effect whereby there is a step or jolt change by driving the motor 142 and therefore the wheels 142a, b in the coupling arrangement for movement of the corresponding rotary control member.

Figure 11:
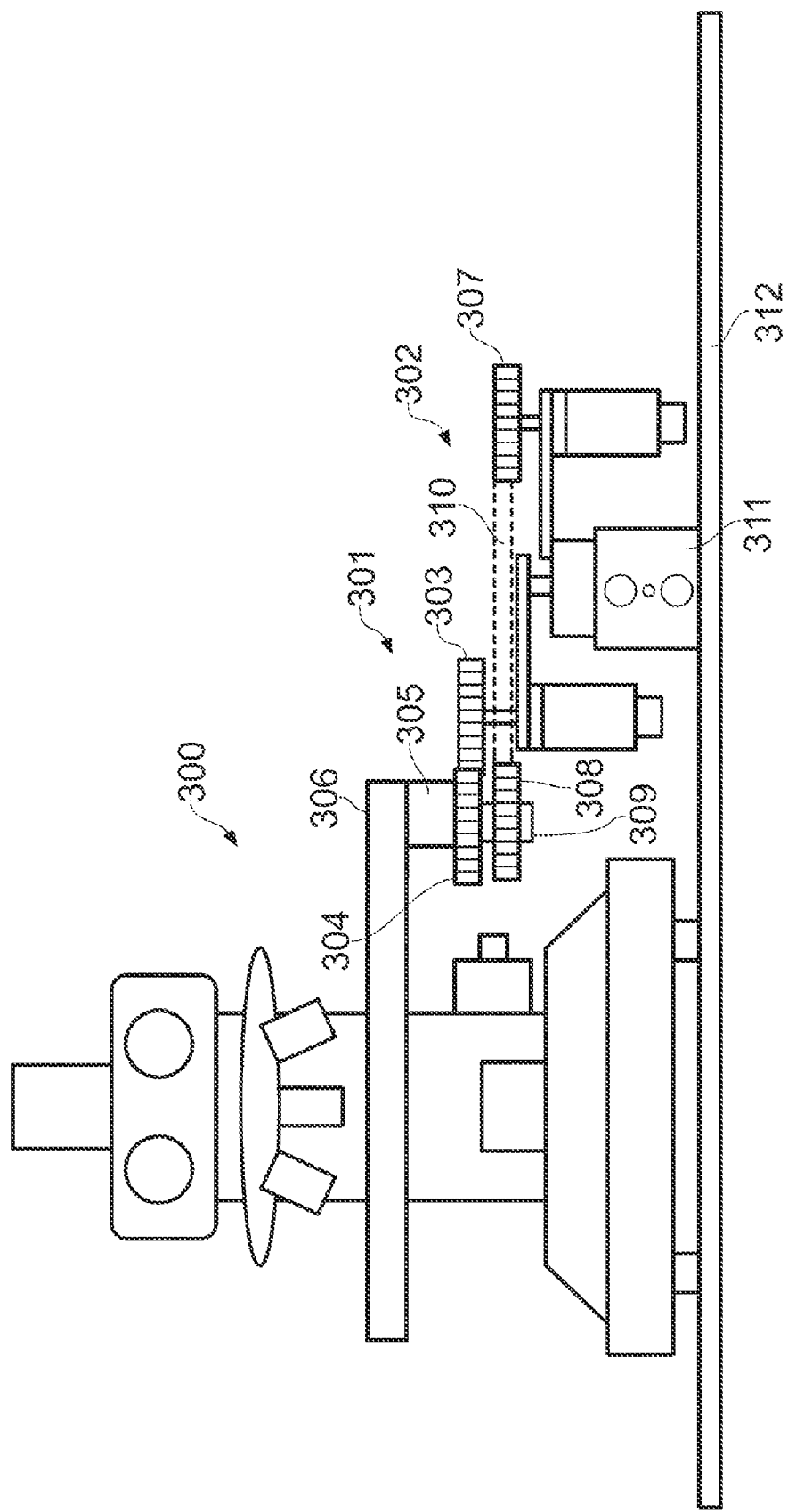
FIG. 11 is a schematic front view of a microscope arrangement incorporating an alternative coupling arrangement assembly in accordance with aspects of the present invention.

As indicated above, fouling between belts can be a problem with regard to control arrangements in accordance with aspects of the present invention. In such circumstances as depicted in FIG. 11 a microscope arrangement 300 is provided in which a control arrangement in accordance with aspects of the present invention incorporates a respective first coupling arrangement 301 and a second coupling arrangement 302. In such circumstances as can be seen the respective arrangements 301, 302 are substantially within each other and avoid problems with respect to fouling.

The first coupling arrangement 301 as described above incorporates a motor wheel 303 which bears directly upon a wheel 304 associated with a rotary control member 305 to cause movement and rotation and therefore drive movement of a platform 306.

The second coupling arrangement 302 comprises a motor wheel 307 driving rotation and movement of a wheel 308 associated with a rotary control member 309. Coupling between the wheels 307, 308 is through a belt 310. In such circumstances operation of the second coupling arrangement 302 is similar to that described above with regard to FIG. 3 and associated description and drawings.

As can be seen the respective coupling arrangements 301, 302 are presented upon a mounting 311 secured to a platform 312. This association as indicated previously can be through magnetic attraction between the mounting 311 and the platform or plate 312. A microscope 313 is similarly robustly secured to the platform or plate 312 by couplings, not shown.

With regard to the second coupling arrangement 302 as indicated previously it is important that the belt 310 remains within a desired tension range. This tension range may be achieved through the nature of the belt 310, that is to say an elastomeric nature held in tension over the displacement range for the platform 306. By appropriate choice of wheels 303, 304 it will be appreciated that engagement between these wheels can be achieved with tension in the belt 310. Furthermore the wheels 303, 304 themselves may have a slight elastomeric nature in order to enhance friction engagement between the teeth of the respective wheels. As indicated above previously the belt 310 and associated wheels 307, 308 will similarly have a tooth engagement for robust driving of the rotary control member 309.

In order to avoid motor burn out and instability it will be appreciated that it is advantageous to determine the limits of displacement. Typically these limits can be achieved through an optical encoder creating pulses in order to terminate operation of the motors in accordance with aspects of the present invention. Determination of the limits of range, that is to say the rotary control members will not rotate any more, can be achieved through use of synchronization between pulses generated by an optical encoder signifying rotation of the respective wheels in the coupling arrangements in accordance with aspects of the present invention. Typically there will be a fixed relationship between the pulses provided to the motors driving the coupling arrangement and the amount of rotation signified by the optical encoder. For example this relationship may be 10,000 pulses to the motors with 1,000 encoder pulses per revolution. In normal operation a stream of motor pulses gives rise to a stream of encoder pulses. With the relationship as described above there will be a ratio of 10:1 between the motor pulses and the optical pulses confirming movement. If the relationship ratio 10:1 fails then it will be appreciated the limit of movement has been achieved. Typically, there will be no encoder pulses sent back. It will also be appreciated that deviations from this ratio may be indicative of lack of tension, that is to say slippage or other problems with regard to the control arrangement which can be flagged by an appropriate signal and induction at the controller 210 for example. Generally controlling processes will define a maximum allowed deviation in the relationship between the motor pulses and the positional optical encoded response pulses confirming appropriate accurate displacement of the platform has been achieved.

We also expect the apparatus 40 to be applicable to provide control of an alternative microscope design, sometimes called an "inverted" microscope, in which the stage is located above the optical system. Inverted microscopes typically have a greater range of stage movement than an upright microscope, and therefore the arrangement of FIGS. 7 and 8 is preferred.

Many variations and modifications can be made to the apparatus described above, without departing from the scope of the invention.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. Control apparatus for a microscope having at least one rotary control member for adjustment of the microscope, the apparatus comprising;
    a motor;
    a coupling arrangement driven, in use, by the motor; and
    a mount arrangement to provide adjustable positioning of the motor relative to the rotary control member, to cause the coupling arrangement to engage the rotary control member to cause the rotary control member to be driven by rotation of the motor;
    and wherein the coupling arrangement comprises a wheel member mounted, in use, on the rotary control member to convey movement to the rotary control member;
    and wherein the mount arrangement comprises a platform for the motor and a platform motor operable to displace the platform and wherein the platform is proportionately displaced with the control member, in use, as the rotary control member is driven by rotation of the motor.

2. An apparatus as claimed in claim 1, wherein the coupling arrangement comprises a rotary member driven, in use, by the motor, and positionable by means of the mount arrangement to bear on the rotary control member to cause the control member to turn.

3. An apparatus as claimed in claim 2, wherein the rotary member engages the rotary control member by friction or by meshing formations.

4. An apparatus as claimed in claim 1, wherein the coupling arrangement comprises a rotary member driven, in use, by the motor, and an endless belt around the rotary member and the rotary control member.

5. An apparatus as claimed in claim 4, wherein the endless belt is of flexible material and is of resilient material.

6. An apparatus as claimed in claim 4, wherein the endless belt is toothed for engagement with the rotary member and rotary control member.

7. An apparatus as claimed in claim 1, wherein the wheel member has an aperture for receiving the rotary control member, and fixing means for engaging the rotary control member when present in the aperture, to retain the rotary control member therein.

8. An apparatus as claimed in claim 7, wherein the fixing means comprises at least one threaded member.

9. An apparatus as claimed in claim 1, wherein the wheel member has an outer surface formed to reduce slippage when being driven.

10. An apparatus as claimed in claim 9, wherein the outer surface is toothed.

11. An apparatus as claimed in claim 1, wherein the mount arrangement is adjustable in height relative to the rotary control member.

12. An apparatus as claimed in claim 1, wherein the mount arrangement includes clamp means operable to clamp the mount arrangement at a chosen position.

13. An apparatus as claimed in claim 12, wherein the or each clamp means is operable to clamp the mount arrangement and/or microscope at any position within a range of positions.

14. An apparatus as claimed in claim 12, wherein the or each clamp means includes a magnetic clamp arrangement.

15. An apparatus as claimed in claim 14, wherein the magnetic clamp arrangement comprises a manually movable magnet within the mount arrangement, and a surface on which the mount arrangement stands, in use, there being metal associated with the surface for causing the mount arrangement to grip the surface or be released by movement of the magnet.

16. An apparatus as claimed in claim 15, wherein the surface is provided by a metal plate.

17. An apparatus as claimed in claim 15, wherein the surface is provided by a body on which the microscope stands, in use.

18. An apparatus as claimed in claim 1, wherein the apparatus further comprises clamp means operable to clamp the microscope at a chosen position.

19. An apparatus as claimed in claim 1, wherein the motor is an electric motor.

20. An apparatus as claimed in claim 19 wherein the motor is a stepper motor.

21. An apparatus as claimed in claim 1, wherein the apparatus comprises control means operable to control the motor to create adjustment of the microscope.

22. An apparatus as claimed in claim 21, wherein the control means comprises an analogue user control for use in instructing adjustment of the microscope.

23. An apparatus as claimed in claim 21, wherein the control means comprises a computer interface for receiving instructions for adjustment.

24. An apparatus as claimed in claim 1, wherein the apparatus is operable to drive a plurality of rotary control members.

25. An apparatus as claimed in claim 1, wherein there are a plurality of motors, coupling arrangements and mount arrangements for driving respective control members.

26. An apparatus as claimed in claim 1 wherein the platform is proportionately displaceable in unison with the control member.

27. An apparatus as claimed in claim 1, wherein the platform is electively displaceable to alter tension in the coupling arrangement.

* * * * *